(12) United States Patent
Bratina et al.

(10) Patent No.: US 8,945,350 B2
(45) Date of Patent: *Feb. 3, 2015

(54) INDUCTION HEATED SCREW

(75) Inventors: James E. Bratina, Greenwood, IN (US);
David Bowering, Indianapolis, IN (US);
Perry Eyster, Brownsburg, IN (US);
Thomas Roberts, Noblesville, IN (US)

(73) Assignee: Heritage Environmental Services LLC, Indianapolis, IN (US)

(*) Notice: Subject to any disclaimer, the term of this patent is extended or adjusted under 35 U.S.C. 154(b) by 813 days.

This patent is subject to a terminal disclaimer.

(21) Appl. No.: 13/191,002

(22) Filed: Jul. 26, 2011

(65) Prior Publication Data

US 2012/0024687 A1 Feb. 2, 2012

Related U.S. Application Data

(60) Provisional application No. 61/368,069, filed on Jul. 27, 2010.

(51) Int. Cl.
*C10G 7/00* (2006.01)
*B01D 3/08* (2006.01)
(Continued)

(52) U.S. Cl.
CPC *B01D 1/223* (2013.01); *C10G 1/02* (2013.01); *C10M 175/0033* (2013.01);
(Continued)

(58) Field of Classification Search
CPC .............. B01D 3/08; B09B 3/00; B09B 5/00; B08B 7/0071; C10M 175/0033; C10G 1/02; C10G 7/00

USPC ............. 203/87, 99, 100; 208/184, 347; 198/657; 202/118; 34/247; 588/301, 588/405, 410

See application file for complete search history.

(56) References Cited

U.S. PATENT DOCUMENTS 3,642,135 A 2/1972 Borden
3,821,106 A 6/1974 Borden
(Continued)

FOREIGN PATENT DOCUMENTS

| JP | 9-155326 A | 6/1997 | |
|---|---|---|---|
| JP | 2004-239687 A | 8/2004 | |
| SU | 1162851 | * 6/1985 | ............... C10F 7/06 |

OTHER PUBLICATIONS

International Search Report and Written Opinion from corresponding PCT application No. PCT/US2011/045352 dated Mar. 28, 2012 (8 pgs).

(Continued)

*Primary Examiner* — Nina Bhat
*Assistant Examiner* — Jonathan Miller
(74) *Attorney, Agent, or Firm* — Brinks Gilson & Lione

(57) ABSTRACT

A method of separating a high boiling component from a mixture containing organic and/or inorganic boiling components which method involves providing an induction heated screw conveyor having an auger and passing the mixture through the induction heated screw conveyor while inductively heating the auger so as to heat the mixture in the induction heated screw conveyor. The mixture is heated to a temperature that is sufficient to cause the boiling component(s) to separate from the mixture as a vapor and the boiling component is removed from the induction heated screw conveyor.

7 Claims, 1 Drawing Sheet

(51) Int. Cl.
*B01D 1/22* (2006.01)
*C10G 1/02* (2006.01)
*C10M 175/00* (2006.01)
*B08B 7/00* (2006.01)
*B09B 3/00* (2006.01)
*C10G 31/06* (2006.01)
*F26B 3/347* (2006.01)
*F26B 17/20* (2006.01)

(52) U.S. Cl.
CPC .............. *B08B 7/0071* (2013.01); *B09B 3/00* (2013.01); *B01D 3/08* (2013.01); *C10G 7/00* (2013.01); *C10G 31/06* (2013.01); *F26B 3/347* (2013.01); *F26B 17/20* (2013.01); *C10G 2300/1003* (2013.01); *C10G 2300/301* (2013.01); *Y10S 203/11* (2013.01)
USPC ............ 203/87; 203/100; 202/118; 208/184; 198/657; 34/247; 588/301; 588/405

(56) References Cited

U.S. PATENT DOCUMENTS

| | | | |
|---|---|---|---|
| 3,963,582 A * | 6/1976 | Helm et al. | 201/2 |
| 4,304,609 A * | 12/1981 | Morris | 134/19 |
| 4,453,319 A * | 6/1984 | Morris | 34/247 |
| 4,778,626 A | 10/1988 | Ramm | |
| 5,036,170 A * | 7/1991 | Arabei et al. | 219/651 |
| 5,144,108 A * | 9/1992 | Passarotto | 219/634 |
| 5,385,749 A | 1/1995 | Serpelloni et al. | |
| 5,632,863 A | 5/1997 | Meador | |
| 5,679,398 A | 10/1997 | Serpelloni et al. | |
| 5,710,360 A | 1/1998 | Self et al. | |
| 5,869,810 A * | 2/1999 | Reynolds et al. | 219/388 |
| 6,226,889 B1 * | 5/2001 | Aulbaugh et al. | 34/424 |
| 6,462,334 B1 * | 10/2002 | Little et al. | 250/281 |
| 6,487,843 B1 | 12/2002 | Tomczyk | |
| 6,840,712 B2 | 1/2005 | Satchwell et al. | |
| 7,028,746 B2 | 4/2006 | Akers et al. | |
| 8,220,178 B2 * | 7/2012 | Schellstede | 34/247 |
| 8,282,787 B2 * | 10/2012 | Tucker | 201/41 |
| 8,784,616 B2 * | 7/2014 | Tucker | 201/32 |
| 2002/0170696 A1 | 11/2002 | Akers et al. | |
| 2003/0228196 A1 | 12/2003 | Satchwell et al. | |
| 2006/0096119 A1 * | 5/2006 | Schellstede | 34/523 |
| 2008/0136066 A1 | 6/2008 | Taylor et al. | |
| 2009/0004318 A1 | 1/2009 | Taylor et al. | |
| 2009/0179064 A1 | 7/2009 | Lee et al. | |
| 2009/0249641 A1 | 10/2009 | Graham et al. | |
| 2009/0281202 A1 | 11/2009 | Eyster et al. | |

OTHER PUBLICATIONS

International Prelininary Report on Patentability and Written Opinion from corresponding PCT application No. PCT/US2011/045352 dated Feb. 7, 2013 (6 pgs).

* cited by examiner

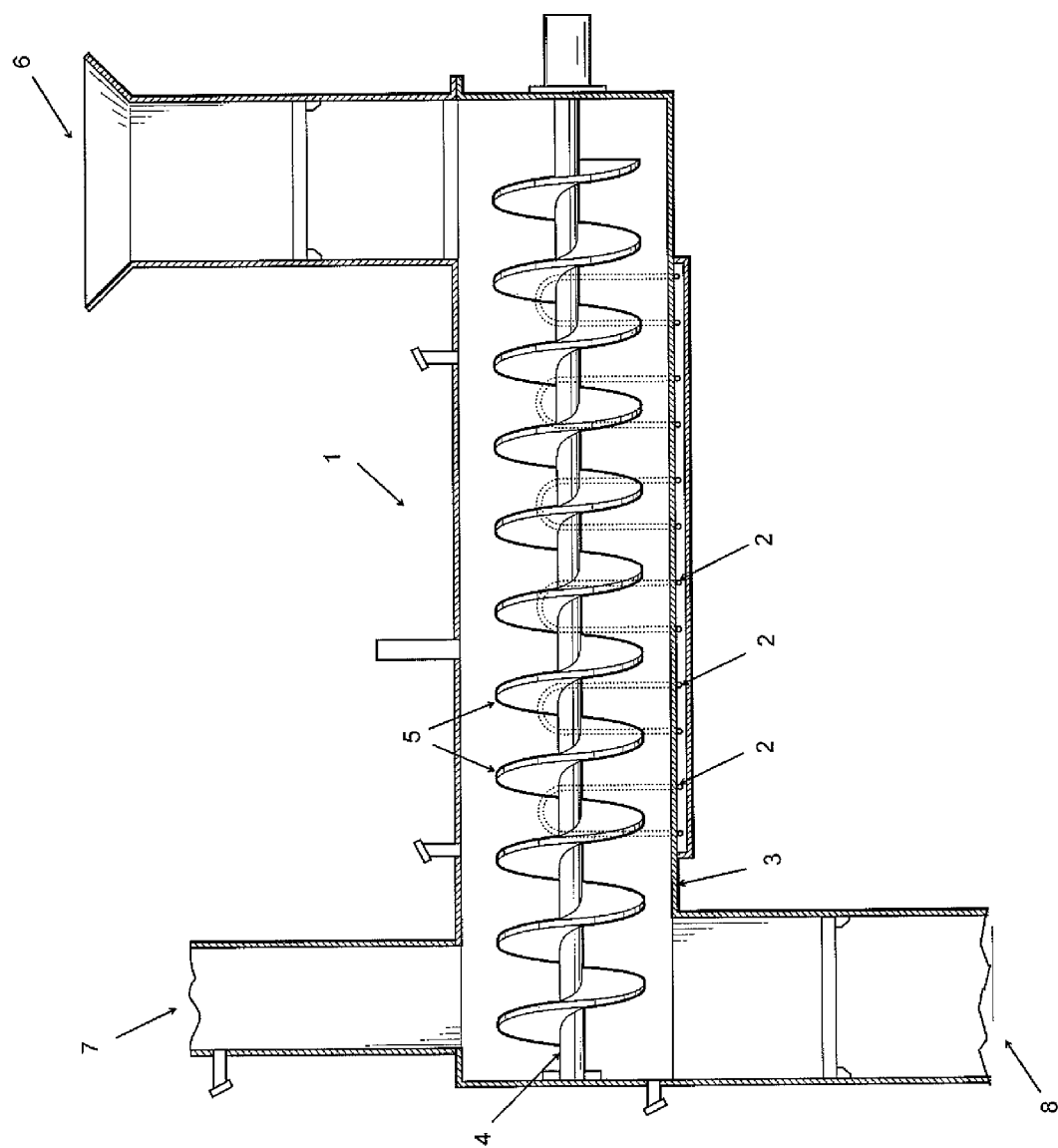

INDUCTION HEATED SCREW

RELATED APPLICATION

The present application is based upon U.S. Provisional Patent Application Ser. No. 61/368,069, filed Jul. 27, 2010 and claims priority thereto under 35 U.S.C. §120. The entire specification of U.S. Provisional Patent Application Ser. No. 61/368,069 is hereby expressly incorporated by reference.

BACKGROUND

The present invention relates generally to separating two or more chemical components from a mixture. More particularly the present invention is directed to a process and apparatus for separating two or more chemical components from a mixture that involves the use of an induction heated screw mechanism.

The ability to remove organics and/or inorganics from waste materials using commercially available thermal dryer systems is limited by the temperature capabilities of such systems. Traditional thermal dryers, such as hot oil screw dryers (commonly referred to as "porcupine dryers") are limited by the temperature that hot oil systems are capable of achieving. Normally the oil used in such hot oil heated drying systems can only be heated to a temperature around 600° F. and even at that, the dryers' operating temperatures can be appreciably less than the maximum temperature at which the oil can be heated due to heating efficiencies, heat transfer efficiencies and heat losses.

If a chemical component such has an organic and/or an inorganic that is to be removed from a mixture such as a waste material or a waste stream has a boiling point that is higher than the maximum operating temperature of a traditional thermal dryer, that chemical component cannot be removed from the mixture using a traditional thermal dryer. Since many organic contaminants that have boiling points that are near or above the maximum operating temperature of traditional thermal dryers are subject to environmental land ban restrictions, these types of waste materials cannot be effectively treated by processes that use thermal dryers. As a result, such waste materials are most often incinerated in hazardous waste incinerators. Specific examples of these kinds of wastes include refinery wastes (or similar materials) that have high boiling point organics such as polycyclic aromatic hydrocarbons (PAH's) that restrict their ability to be disposed in a landfill.

The following U.S. patents exemplify various systems and process that use inductive thermal screws: U.S. Pat. No. 3,642,135 to Borden, U.S. Pat. No. 3,821,106 to Borden, U.S. Pat. No. 5,385,749 to Serpelloni et al., U.S. Pat. No. 5,632,863 to Meador, U.S. Pat. No. 5,679,398 to Serpelloni et al., U.S. Pat. No. 5,710,360 to Self et al., U.S. Pat. No. 6,487,843 to Tomczyk, U.S. Pat. No. 6,840,712 to Satchwell et al., and U.S. Pat. No. 7,028,746 to Akers et al. The following published pending U.S. patent applications also exemplify various systems and process that use inductive thermal screws: 2002/0170696 to Akers et al., 2003/0228196 to Satchwell et al., 2008/0136066 to Taylor et al., 2009/0004318 to Taylor et al., 2009/0179064 to Lee et al., 2009/0249641 to Graham et al., 2009/0281202 to Eyster et al.

The present invention provides a method for separating two or more chemical components from a mixture that involves the use of an induction heated screw mechanism.

BRIEF SUMMARY

According to various features, characteristics and embodiments of the present invention which will become apparent as the description thereof proceeds, the present invention provides a method of separating a boiling component from a mixture containing a boiling component which method comprises:

providing an induction heated screw conveyor having an auger;

passing the mixture through the induction heated screw conveyor while inductively heating the auger so as to heat the mixture in the induction heated screw conveyor primarily from at least one of the center or a side wall of the induction heated screw conveyor;

allowing the boiling component to separate from the mixture as a vapor; and removing the separated boiling component from the induction heated screw conveyor.

BRIEF DESCRIPTION OF THE DRAWINGS

The present invention will be described with reference to the attached drawing which is given as a non-limiting example only, in which:

FIG. 1 is a cross-sectional view of an induction heated thermal screw conveyor according to one embodiment of the present invention.

DETAILED DESCRIPTION OF THE DRAWINGS AND THE PRESENTLY PREFERRED EMBODIMENTS

The present invention is directed to a process for separating two or more components from a mixture. More particularly the present invention is directed to a process for separating two or more components from a mixture that utilizes an induction heated screw mechanism and has particular applicability for removing boiling organics from various materials, including waste materials. The separation of the components includes removing components or interest and/or removing other components and retaining components of interest.

The reference herein to a "component" or "components" includes both organic and inorganic chemical components, including components that are mixed, reacted, or combined together in any manner.

The reference herein to a "mixture" or "mixtures" is not limited to any particular type or combination of physical phases. Accordingly liquid-liquid mixtures, liquid-solid mixtures and solid-solid mixtures, including suspensions, solutions, colloids, heterogeneous mixtures, homogeneous mixtures, etc. can be processed according to the present invention. Moreover components of the mixture can include inert components or compounds, volatile components or compounds, reactive components or compounds, etc.

According to the present invention the use of an induction heated screw mechanism provides an extremely thermal efficient manner of processing materials that cannot be processed by conventional thermal equipment, including thermal type dryers.

The induction heated screw mechanism of the present invention is an induction heated screw conveyor that functions as a furnace to both heat and transfer materials through the mechanism.

According to one embodiment, the invention provides for the removal of organics and/or inorganics from solid materials to either recover materials for reuse or to allow the materials to be disposed in a less costly manner. The use of the induction heated thermal screw according to the present invention allows indirect heat to be applied to the material by heating the auger in the center of the screw conveyor. The auger in the induction heated screw conveyor transfers the heat into the material being heated. This heating volatilizes the organic and/or organic materials to remove them from the material being treated. The operating temperature of this invention is limited only by the temperature that can be attained by the materials of construction for the auger in the screw conveyor system. In another embodiment of the present invention the wall(s) of the screw conveyor could also be heated inductively together with or separately from the auger by selecting appropriate materials of construction that either do not become inductively heated or do become inductively heated.

The process and induction heated thermal screw of the present invention can be built on a variety of scales allowing it to be used directly at locations where waste materials are being produced. Providing appropriately sized processing units on site, particularly for relatively small applications will minimize the transportation of materials being processed and associated costs. The induction heated thermal screw conveyor of the present invention also has a small number of parts and support equipment that reduce its initial capital cost and reduces the maintenance complexity as compared to thermal driers that use hot oil systems. The processing of waste materials at a location where the waste materials are produced may also present additional opportunities for the reuse of the recovered inorganic materials back into the processes that produced the waste materials. The induction heated screw conveyor can be sealed so as to enable control of the atmosphere therein. This is particularly desired when separating components that are easily oxidized, in which case a reducing atmosphere could be maintained within the induction heated screw conveyor.

The invention described is a manner of using induction heating to increase the temperature of the auger and/or side wall(s) of a screw conveyor to heat material within the screw conveyor. One application of this invention is the removal of organics and/or inorganics from materials to: 1) recover the organics and/or inorganics for reuse; 2) remove the organics and/or inorganics from the material being processed to allow it to be reused; or 3) remove the organics and/or organics from the material being processed to allow it to be disposed in a less costly manner. It may be economical to operate the induction heated screw at lower temperature in certain applications, but in most cases one benefit of the present invention is the ability to operation the inductive heated thermal screw conveyor system at a temperature above the operating temperatures of conventional thermal dryer systems. Operating the inductive heated thermal screw conveyor system at a temperature up to about 750° F. is desirable to avoid cracking or thermal decomposition of components of interest that can occur at higher temperatures.

FIG. 1 is a schematic view of an induction heated thermal screw conveyor according to one embodiment of the present invention. As depicted in FIG. 1 the invention consists of a fairly conventional screw conveyor 1 that is wrapped with one or more induction heating coils 2. The induction heating coils 2 are wrapped around the trough section 3 of the screw conveyor 1. An insulator material (not shown) is positioned between the induction heating coils 2 and the trough 3 to both insulate the unit and to prevent the induction heating coils 2 from short circuiting. The induction heating coils 2 are primarily provided to heat the auger 4, including the metal flights 5 of the auger 4 in the screw conveyor 1, while only providing a limited amount of energy to heat the screw conveyor trough 3.

This targeted or selective heating of the auger 4 is accomplished by fabricating the auger 4 from materials that are more susceptible to induction heating, such as ferrous materials, including iron and alloys of iron, and fabricating the trough section 3 from materials that are less susceptible to induction heating, such as stainless steel.

As the auger 4 in the screw conveyor 1 is heated, heat is transferred from the auger 4 to the material being transported by the conveyor system. The material in the screw conveyor 1 is transported by the rotation of the auger 4 which causes the flights 5 to push material through the screw conveyor 1. The high surface area of the screw conveyor system, including the flights 5, and the movement of the material being treated through the system provide an extremely efficient transfer of heat. In particular the material is predominately heated at or from the center of the screw conveyor where the auger is located rather than at or from the sides of the trough. This manner of heating greatly limits heat loses from the trough to the ambient environment. The operating temperature of the system is limited only by the materials of construction. As long as the components of the screw conveyor can withstand the operating temperature without malfunctioning, the system can operate.

In FIG. 1 a feed material mixture is fed into the screw conveyor 1 through inlet 6, as the material mixture moves through the screw conveyor and is heated, higher boiling components are released as vapors. These vapors are drawn off and out of the screw conveyor through outlet 7. The remaining portion of the material mixture is removed through outlet 8. Herein "boiling component" refers to a component in a mixture that has a boiling point that is low enough to be released from the mixture by being volatilized or boiled from the mixture when the mixture is heated. According to the present invention temperatures up to about 750° F. can be used. Temperatures much higher than 750° F. can cause cracking or thermal decomposition of boiling components that are desired to be recovered.

FIG. 1 illustrates the trough of the screw conveyor as being horizontal. In other embodiments of the present invention, the trough of the screw conveyor can be inclined with the vapor recovery outlet at an upper end or point in the screw conveyor system.

It is also within the present invention to either uniformly heat the screw conveyor along the length thereof or to heat different sections of the screw conveyor to different temperatures.

In an operation that separates higher boiling organics and/or other volatile materials or components from a feed material mixture, as the higher boiling organics and/or other volatile materials or components are drive off or out of the mixture in the induction heated screw system, they move into the space above the screw flights. The vapors in the space above the screw flight can be drawn off by for collection and subsequent treatment, recovery or destruction as desired.

In the case of removing and recovering inorganic components such as phosphorus (which has a boiling point of 280° C. or 536° F.) the atmosphere within the space above the screw flights should be controlled to be reducing or inert to prevent oxidation.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method of separating a boiling component from a mixture containing a high boiling component which method comprises:

provided an induction heated screw conveyor having an auger; passing the mixture through the induction heated screw conveyor while inductively heating the auger so as to heat the mixture in the induction heated screw conveyor primarily from the center of the induction heated screw conveyor;

allowing the boiling component to separate from the mixture as a vapor; and removing the separated boiling component from the induction heated screw conveyor, wherein at least one of the boiling component and the high boiling component has a boiling temperature of up to 750° F.

2. A method of separating a boiling component from a mixture containing a high boiling component according to claim 1, wherein the high boiling compound comprises an organic.

3. A method of separating a boiling component from a mixture containing a high boiling component according to claim 1, wherein the high boiling compound comprises an inorganic.

4. A method of separating a boiling component from a mixture containing a high boiling component according to claim 1, wherein the mixture comprises a solid phase.

5. A method of separating a boiling component from a mixture containing a high boiling component according to claim 1, wherein the mixture comprises a waste material.

6. A method of separating a boiling component from a mixture containing a high boiling component according to claim 5, wherein the mixture comprises a refinery waste.

7. A method of separating a boiling component from a mixture containing a high boiling component according to claim 5, wherein the mixture comprises a hazardous waste.

* * * * *